United States Patent
Gunnarsson et al.

(10) Patent No.: US 9,832,731 B2
(45) Date of Patent: Nov. 28, 2017

(54) METHODS AND ARRANGEMENTS IN A WIRELESS COMMUNICATION SYSTEM

(71) Applicant: IDTP Holdings, Inc., Wilmington, DE (US)

(72) Inventors: Fredrik Gunnarsson, Linkoping (SE); Johan Bergman, Stockholm (SE); Eva Englund, Linkoping (SE)

(73) Assignee: IDTP Holdings, Inc., Wilmington, DE (US)

( * ) Notice: Subject to any disclaimer, the term of this patent is extended or adjusted under 35 U.S.C. 154(b) by 237 days.

(21) Appl. No.: 14/728,232

(22) Filed: Jun. 2, 2015

(65) Prior Publication Data

US 2015/0271760 A1  Sep. 24, 2015

Related U.S. Application Data

(63) Continuation of application No. 14/078,968, filed on Oct. 8, 2013, now Pat. No. 9,078,216, which is a
(Continued)

(51) Int. Cl.
*G06F 11/00* (2006.01)
*H04W 52/12* (2009.01)
(Continued)

(52) U.S. Cl.
CPC .......... *H04W 52/12* (2013.01); *H04L 1/1812* (2013.01); *H04W 52/146* (2013.01);
(Continued)

(58) Field of Classification Search
CPC ..................................................... H04W 52/12
See application file for complete search history.

(56) References Cited

U.S. PATENT DOCUMENTS 5,479,409 A  12/1995  Dupuy et al.
6,633,559 B1  10/2003  Asokan et al.
(Continued)

FOREIGN PATENT DOCUMENTS

CN  1808937 A  7/2006
CN  101018076 A  8/2007
(Continued)

OTHER PUBLICATIONS

ETSI TS 125 427 V8.0.0, "Universal Mobile Telecommunications System (UMTS); UTRAN Iur/Iub Interface User Plane Protocol for DCH Data Streams" (3GPP TS 25.427 V8.0.0, Release , Oct. 2008.
(Continued)

*Primary Examiner* — Christopher McCarthy
(74) *Attorney, Agent, or Firm* — Condo Roccia Koptiw LLP

(57) ABSTRACT

The present invention relates to methods and arrangements in a wireless communication system, and in particular to uplink outer loop power control.
A Node B identifies if a UE from which the Node B receives data is in a predetermined set of power challenged situations. The Node B transmits to the RNC an indication to hold the SIR target of the UE if the UE has been identified to be in a power challenged situation. As a consequence, the uplink outer loop power control (OLPC) procedure in the RNC will not change the SIR target of the UE. This implies that the output power level of the UE remains unchanged as long as the UE remains in the power challenged situation. Thus, user and network performance are improved in the wireless communication system.

18 Claims, 4 Drawing Sheets

Related U.S. Application Data continuation of application No. 12/741,735, filed as application No. PCT/SE2008/051118 on Oct. 2, 2008, now Pat. No. 8,583,974.

(60) Provisional application No. 60/985,714, filed on Nov. 6, 2007.

(51) Int. Cl.

| | | |
|---|---|---|
| *H04W 52/36* | (2009.01) | |
| *H04W 52/38* | (2009.01) | |
| *H04L 1/18* | (2006.01) | |
| *H04W 52/48* | (2009.01) | |
| *H04W 52/14* | (2009.01) | |
| *H04W 52/22* | (2009.01) | |
| *H04W 52/24* | (2009.01) | |

(52) U.S. Cl.
CPC ....... *H04W 52/221* (2013.01); *H04W 52/243* (2013.01); *H04W 52/247* (2013.01); *H04W 52/248* (2013.01); *H04W 52/367* (2013.01); *H04W 52/386* (2013.01); *H04W 52/48* (2013.01)

(56) References Cited

U.S. PATENT DOCUMENTS

| | | | |
|---|---|---|---|
| 7,363,010 B2 | 4/2008 | Oh et al. | |
| 7,529,548 B2* | 5/2009 | Sebastian | H04W 28/20 370/230.1 |
| 7,853,283 B2 | 12/2010 | Usuda et al. | |
| 7,865,212 B2 | 1/2011 | Tysowski | |
| 7,885,212 B2 | 2/2011 | Gerstenberger et al. | |
| 8,116,351 B2 | 2/2012 | Koo et al. | |
| 8,254,936 B2 | 8/2012 | Torsner et al. | |
| 8,654,653 B2 | 2/2014 | Bae | |
| 2006/0092887 A1 | 5/2006 | Iacono et al. | |
| 2006/0160557 A1 | 7/2006 | Chang | |
| 2007/0042719 A1 | 2/2007 | Campo Camacho et al. | |
| 2008/0056129 A1 | 3/2008 | Usuda et al. | |
| 2008/0077837 A1 | 3/2008 | Lohr et al. | |
| 2008/0084848 A1 | 4/2008 | Jard et al. | |
| 2008/0287132 A1 | 11/2008 | Torsner et al. | |
| 2009/0149134 A1 | 6/2009 | Gunnarsson et al. | |
| 2009/0202013 A1 | 8/2009 | Sebastian | |
| 2009/0305712 A1 | 12/2009 | Franceschini et al. | |
| 2010/0056169 A1 | 3/2010 | Koo et al. | |
| 2010/0234041 A1 | 9/2010 | Larsson et al. | |
| 2010/0238832 A1 | 9/2010 | Gunnarsson et al. | |
| 2011/0038430 A1 | 2/2011 | Yoshimoto et al. | |
| 2011/0098076 A1 | 4/2011 | Kim et al. | |
| 2011/0255515 A1 | 10/2011 | Maeda et al. | |
| 2012/0002610 A1 | 1/2012 | Widgren et al. | |
| 2012/0099444 A1 | 4/2012 | Hakola et al. | |
| 2012/0163192 A1 | 6/2012 | Bae | |

FOREIGN PATENT DOCUMENTS

| | | | |
|---|---|---|---|
| EP | 1091503 A2 | 4/2001 | |
| EP | 1583270 A1 | 10/2005 | |
| RU | 2285337 C2 | 10/2006 | |
| WO | WO 00/74420 | 12/2000 | |
| WO | WO 02/047361 A2 | 6/2002 | |
| WO | WO 2004/091114 A1 | 10/2004 | |
| WO | WO 2006/091137 A1 | 8/2006 | |
| WO | WO 2008/140389 A | 11/2008 | |

OTHER PUBLICATIONS

3GPP TS 25 427 V7.5.0, "3$^{rd}$ Generation Partnership Project: Technical specification Group Radio Access Network; UTRAN Iur/Iub Interface User Plane Protocol for DCH Data Streams" (Release 7), Sep. 2007.

International Preliminary Report on Patentablility dated Feb. 19, 2010 in PCT Application No. PCT/SE2008/051118.

International Search Report dated Jun. 30, 2009 in PCT Application No. PCT/SE2008/051118.

International Search Report for PCT/SE2008/050647, dated Apr. 1, 2009.

Written Opinion of the International Searching Authority for PCT/SE2008/050647, dated Apr. 1, 2009.

English Translation of Russian Decision to Grant issued in Application 2010123006.

3GPP TSG-RAN WG1 #52bis, Tdoc R1-081619, "EUL Coverage Enhancements", Shenzhen, China, Mar. 31-Apr. 4, 2008.

\* cited by examiner

US 9,832,731 B2

METHODS AND ARRANGEMENTS IN A WIRELESS COMMUNICATION SYSTEM

This application is a continuation of U.S. patent application Ser. No. 14/048,968 filed Oct. 8, 2013, which is a continuation of U.S. patent application Ser. No. 12/741,735 filed May 6, 2010, which is the U.S. national phase of International Application No. PCT/SE2008/051118 filed 2 Oct. 2008, which designated the U.S. and claims the benefit of U.S. Provisional Application No. 60/985,714 filed 6 Nov. 2007, the entire contents of each of which are hereby incorporated by reference, and this application claims the benefit of the filing date of these prior applications under, inter alia, 35 U.S.C. §§120, 119, 365, 371 as applicable.

TECHNICAL FIELD

The present invention relates to methods and arrangements in a wireless communication system, and in particular to uplink outer loop power control.

BACKGROUND

The 3rd Generation Partnership Project (3GPP) is a collaboration between groups of telecommunications associations, to make a globally applicable third generation mobile phone system specification within the scope of the International Mobile Telecommunications-2000 project of the International Telecommunication Union (ITU). 3GPP specifications are based on evolved Global System for Mobile Communications (GSM) specifications. 3GPP standardization encompasses Radio, Core Network and Service architecture. The general architecture of a third generation mobile communication system 10 and its evolutions is illustrated in FIG. 1. The core network is the central part of a mobile network that provides various services to customers who are connected by the access network. The user equipment 20 is a mobile terminal by which a subscriber can access services offered by an operator's core network. The Radio Access Network (RAN) is the part of the network that is responsible for the radio transmission and control of the radio connection. A Radio Network Subsystem (RNS) consists of one Radio Network Controller (RNC) 40 and one or several base stations (BS) 30. Further, the Radio Network Controller (RNC) 40 controls radio resources and radio connectivity within a set of cells, as well as controlling the base stations within the RNS. A cell covers a geographical area and the radio coverage in a cell is provided by the base station handling radio transmission and reception within one or more cells.

In the 3GPP release 99, the RNC controls resources and user mobility. Resource control in this framework refers to admission control, congestion control, channel switching i.e. roughly changing the data rate of a connection. Furthermore, a dedicated connection is carried over a dedicated channel (DCH), which is realized as a Dedicated Physical Control Channel (DPCCH) and a Dedicated Physical Data Channel (DPDCH).

In enhanced 3G standards such as UMTS Release 6 specifications for Enhanced Uplink (EUL), the trend is to decentralize decision making and in particular the control over the short term data rate of the user connection. The uplink data is then allocated to E-DCH (enhanced DCH), which is realized as a DPCCH, which is continuous, and a E-DPCCH for data control and a E-DPDCH for data. The latter two are only allocated when there is uplink data to send. Hence, the base station uplink scheduler determines which transport formats each user can use over E-DPDCH. The RNC is however still responsible for admission and congestion control.

In W-CDMA (Wideband Code Division Multiple Access) the dedicated channels are power-controlled. In the uplink, this means that the base station measures the received DPCCH signal quality, SIR, and compares the measurements to a desired signal quality, SIR target. If the SIR is less than or equal to the SIR target, the base station signals the transmitter power control command 'up' to the UE to make it increase the power by a predefined step. If the SIR is higher than the SIR target, the base station signals the transmission power control command 'down' to the UE to make it decrease the power by a predefined step. The SIR target is regularly updated by the RNC via the DCH frame protocol procedures known as outer loop power control (OLPC). For DCH, the OLPC adjustments of SIR target are based on the Cyclic Redundancy Check Indicator (CRCI) indicating whether a data block was correctly decoded or not. For E-DCH, the hybrid automatic repeat request (HARQ) receiver handles multiple transmissions of a data block, which means that it is instead the number of HARQ retransmissions that are of interest. The number of HARQ retransmissions is sent over the DCH frame protocol procedures as well together with the data blocks. The number of HARQ retransmissions is coded by four bits in a "number of HARQ retransmissions" field in the DCH frame protocol, wherein value 0-11 indicates the number of HARQ retransmissions, value 12 indicates 12 or more HARQ retransmissions and value 15 indicates that the number of HARQ retransmissions is unknown. When the RNC receives a correctly decoded data block together with the value indicating the number of retransmissions, the latter value is compared to value of a target number of retransmissions. If the number of retransmissions exceeds the target number of retransmissions, the OLPC increases SIR target by a predefined step A, and if the number of retransmissions is lower or equal to the target number of retransmissions the OLPC decreases the SIR target by a predefined step B. The steps A and B are directly proportional to a configurable step size, and related to a configurable probability that the number of retransmissions exceeds the target number of retransmissions.

Moreover, when the number of retransmissions reaches a predefined limit, the base station signals HARQ error to the RNC according to the DCH frame protocol. In that signaled frame, the value of the number of retransmissions when the HARQ error occurred should also be indicated.

SUMMARY

The uplink OLPC resides in the RNC and the RNC is unaware of the actual uplink situation in the base station i.e. the Node B. For example, a high number of HARQ retransmissions could be due to power limitation in the UE, in which case the action of increasing the SIR target only worsens the situation. In another example the Node B employs interference cancellation which temporarily could be less efficient than normal. The high number of retransmissions causes the SIR target to increase which is unnecessary whether interference cancellation algorithm has recovered.

The object of the present invention is to improve network and user performance in a wireless communication system.

The object is achieved by identifying in the base station if the UE is in at least one of a set of predetermined UE power challenged situations when the base station receives uplink data from a UE. An indication to hold the SIR target of the UE is set by the base station if the UE has been identified to be in at least one of a set of predetermined UE power challenged situations. Further, the base station signals the indication to the radio network controlling node comprised in the wireless communication system. The radio network controlling node received the indication and holds the SIR target of the UE.

According to a first aspect of the present invention a method for a network node is provided. In the method the network node receives uplink data from at least one UE and identifies whether the at least one UE is in at least one of a set of predetermined UE power challenged situations. The network node sets an indication to hold a SIR target of the at least one UE if the at least one UE has been identified to be in at least one of a set of predetermined UE power challenged situations. Moreover, the network node signals the indication to a radio network controlling node comprised in the wireless communication system.

According to a second aspect of the present invention a network node is provided. The network node comprises a receiver for receiving uplink data from at least one UE and means for identifying whether the at least one UE is in at least one of a set of predetermined UE power challenged situations. Furthermore, the network node comprises means for setting an indication to hold a SIR target of the at least one UE if the at least one UE has been identified to be in at least one of a set of predetermined UE power challenged situations. The network node further comprises a transmitter for signaling the indication to a radio network controlling node comprised in the wireless communication system.

According to a third aspect of the present invention a method in a radio network controlling node is provided. In the method the radio network controlling node receives from a network node data associated with at least one UE and an indication associated with the at least one UE to hold a SIR target of the at least one UE if the at least one UE has been identified to be in at least one of a set of predetermined UE power challenged situations. Further, the radio network controlling node holds the SIR target of the at least one UE if indicated in the indication.

According to a fourth aspect of the present invention a radio network controlling node is provided. The radio network controlling node comprises a receiver for receiving from a network node data associated with at least one UE and an indication associated with the at least one UE to hold a SIR target of the at least one UE if the at least one UE has been identified to be in at least one of a set of predetermined UE power challenged situations. Moreover, the radio network controlling node comprises means for holding the SIR target of the at least one UE if indicated in the indication.

An advantage with embodiments of the present invention is that it provides a method to inform the RNC to hold the SIR target of a UE when the Node B has identified a situation in which changing the output power of the UE would worsen the situation.

Another advantage with the embodiments of the present invention is that user performance is improved as an increase of the output power level is avoided when the UE is power limited.

A further advantage with the embodiments of the present invention is that unnecessary increases of output power of the UE are avoided.

A further advantage with the embodiments of the present invention is that valuable uplink radio resources are saved.

Yet another advantage is that the embodiments of the present invention reduce power rushes in the communication system.

Yet another advantage is that instability situations take less time to resolve.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
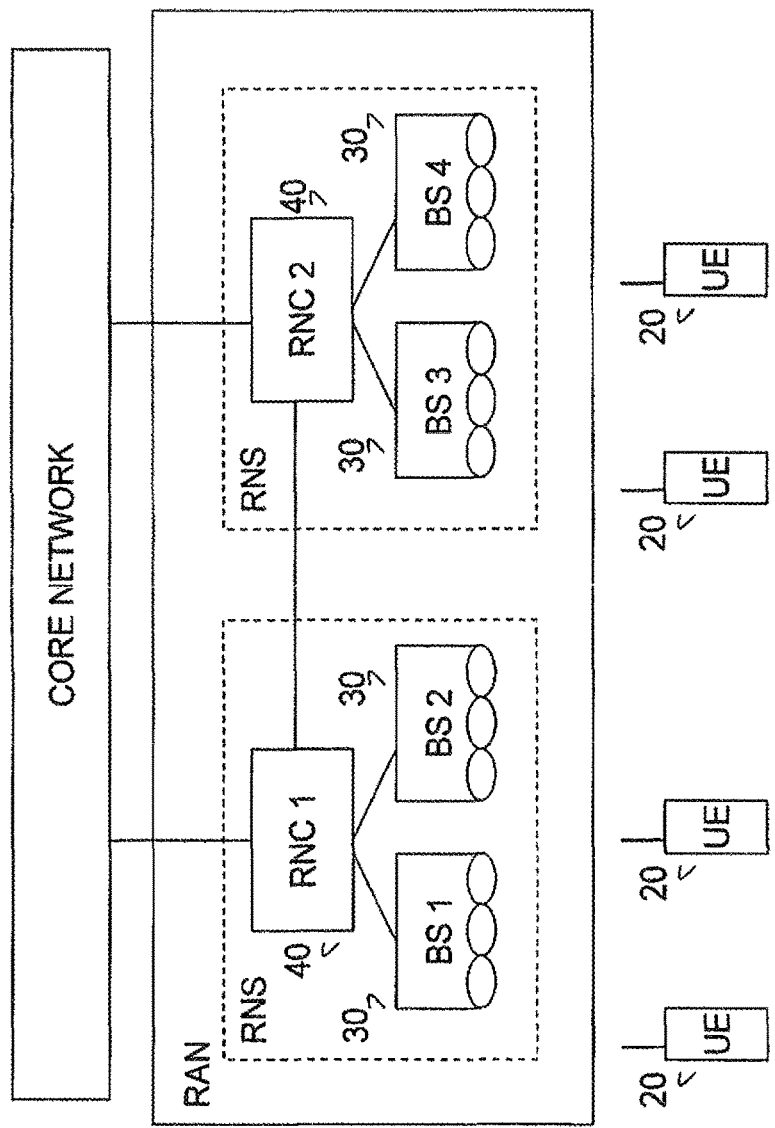
FIG. 1 shows the architecture of a radio access network in accordance with the present invention.

The present invention relates to methods and arrangements for data transmission utilizing a hybrid automatic repeat request protocol in a wireless communication system. The architecture of such a communication system is illustrated in the above-described FIG. 1.

According to one embodiment of the present invention, the network node 30, e.g. a Node B, identifies if a UE 20 from which the Node B 30 receives data is in a power challenged situation. The Node B 30 transmits to the radio network controlling node, e.g. a RNC 40, an indication to hold the SIR target of the UE 20 if the UE 20 has been identified to be in a power challenged situation. As a consequence thereof the uplink OLPC in the RNC 40 will not change the SIR target of the UE 20. Moreover, this implies that the output power level of the UE 20 remains unchanged as long as the UE remains in the power challenged situation.

Figure 2:
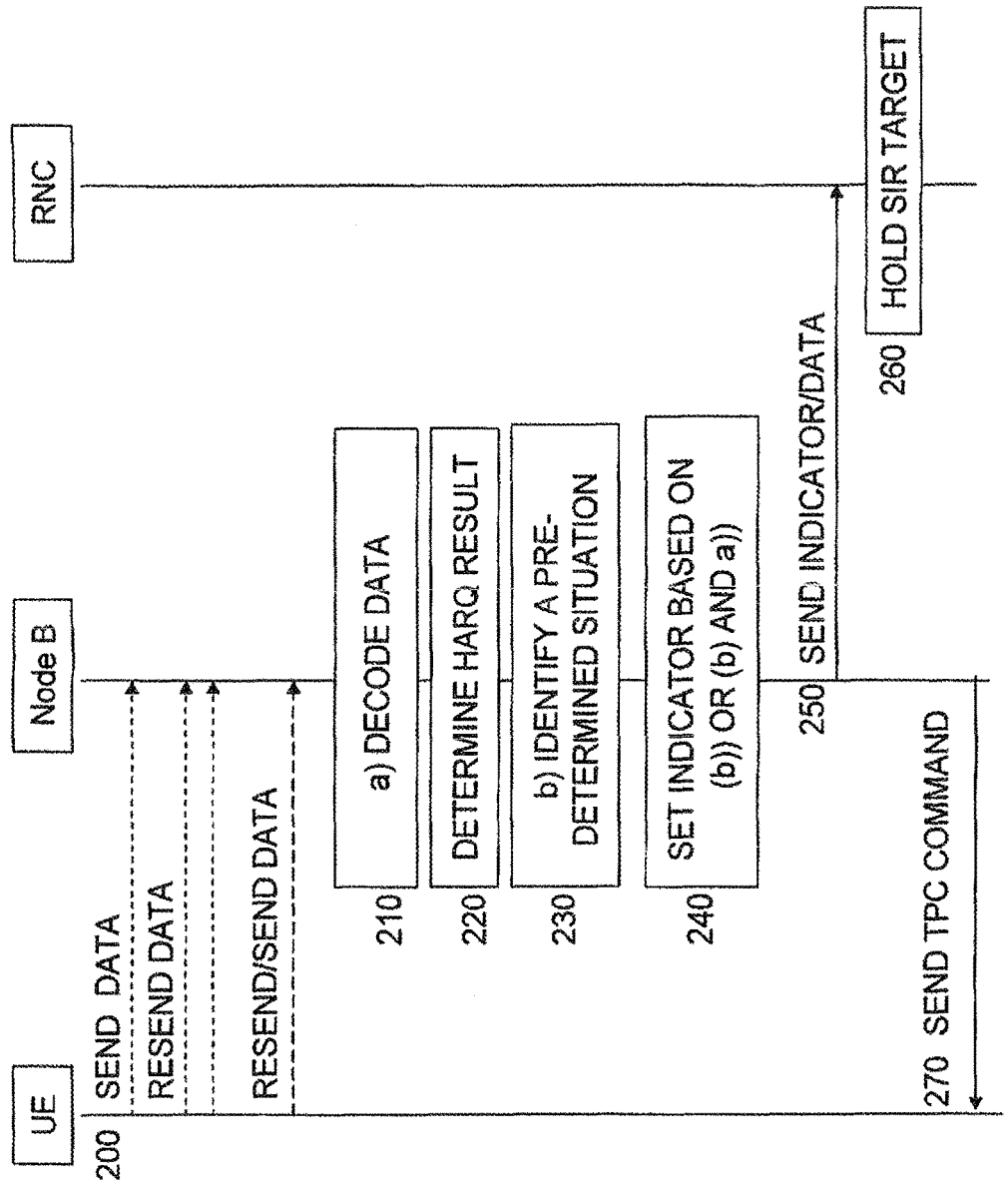
FIG. 2 is a flowchart illustrating the method of the present invention.

Turning now to FIG. 2 showing a flowchart of a method according to an embodiment of the present invention.

In the wireless communication system, the UE 20 transmits uplink data 200 to the Node B 30, whereupon the Node B 30 receives the uplink data in a HARQ receiver. The HARQ receiver decodes 210 the received uplink data using a HARQ protocol and the number of HARQ retransmissions of the uplink data is determined 220. In a further step the Node B 30 identifies if the UE 20 is in a power challenged situation 230 in which OLPC reactions should be avoided. If Node B 30 has identified that the UE 20 is in a power challenged situation the Node B 30 sets an indication 240 to hold a SIR target of the UE 20. Furthermore, the indication is implemented as an indicator which the Node B signals 250 to the RNC 40 comprised in the wireless communication system. The indication is received in the RNC 40 which holds the SIR target of the UE 20 during the following OLPC procedure.

According to one alternative the indication and the uplink data are sent together in the DCH frame protocol to the RNC 40. According to another alternative the indicator is sent using a dedicated field or information element of the DCH frame protocol.

In yet another alternative, the RNC 40 is made aware of the situation by using the DCH frame protocol and in particular the "number of HARQ retransmissions" (NHR) field, specified in the DCH frame protocol.

In a further alternative the NHR field in the DCH frame protocol is always set to the value 14 if the Node B 30 has identified a UE power challenged situation. Thus, both for correctly decoded data and for HARQ error the NHR field is set to value 14. Consequently, the RNC 40 holds the SIR target of the UE 20 during the OLPC procedure.

It should be pointed out that value 13 also could be used instead of value 14 to indicate the Node B 30 has identified a UE power challenged situation.

In another embodiment of the present invention, when the uplink data has been correctly decoded by the HARQ receiver, the NHR field in the DCH frame protocol is set to value 14 (or 13) when the number of retransmissions exceeds 0. Thus, the NHR field is set to indicate hold the SIR target of the UE 20. In addition, when the number of retransmissions is zero, i.e. when the first transmission was correctly decoded, this is stated in the NHR field in the DCH frame protocol signaled to the RNC. Moreover, when HARQ errors occur, the NHR field is set to the number of retransmissions required, when the HARQ error occurred. Consequently, the OLPC procedure in the RNC will cause the SIR target to decrease the SIR target of the UE 20 in case of no retransmissions was needed in the uplink and to increase the SIR target in case of HARQ error. Thus, the OLPC procedure will have a dead zone in which the SIR target remain fixed, but is adjusted at the two extreme cases no retransmission and HARQ error, respectively.

In yet another embodiment of the present invention, the indication to hold outer loop power control is implemented as one indicator to start holding the OLPC, and one indicator to stop holding OLPC.

In the following a number of embodiments of the present invention describe a set of power challenged situations identified by the Node B. The different situations may be comprised in a set of predetermined UE power challenged situations which may be identified by the Node B. The Node B may establish that the UE 20 is in a power challenged situation in a periodically repeated procedure.

Firstly, a predetermined situation may be when the UE 20 is power limited. The UE 20 will require more retransmissions due to the power shortage. Furthermore, if the OLPC procedure would not hold the SIR target but instead increase the SIR target, i.e. cause the UE 20 to increase its power level; it would only worsen the situation.

Secondly, a predetermined situation may be when the Node B 30 employs interference cancellation, which temporarily could be less efficient than normally, e.g. due to channel estimation convergence. If the resulting high number of retransmissions in such a situation would not cause the OLPC procedure to hold the SIR target, it would cause the UE 20 to increase its power level, which is not needed when the interference cancellation algorithm has recovered.

Thirdly, a predetermined situation may be when the Node B 30 has detected instability and wish to avoid power rushes by holding the uplink power control while solving the instability. The detection of instability by the Node B 30 may be based on that the estimated uplink noise rise has exceeded a predefined threshold or that the SIR error variance has exceeded a predefined threshold. It should be noted that instability indicators could be utilized in connection with the detection of instability in order to reduce false alarms and to make the detection more reliable.

Inner loop power control in the uplink is the ability of the UE 20 to adjust its output power in accordance with one or more TPC (transmit power control) commands received in the downlink 270. When an instability situation has been detected the inner loop power control could be held by sending alternating TPC commands to the UE 20: up-down-up-down i.e. TPC command toggling. This could be applied to all uplink connections in a cell or a subset of the uplink connections in the cell. However, it is well known that TPC command toggling may cause problems in soft handover i.e. a UE 20 is simultaneously connected to two or more cells during a call. Consequently, the toggling may only be used for UEs that are not in soft handover. For UEs in soft handover it could be avoided by transmitting any TPC commands from the cell that wishes to hold the UEs output power level and rely on the TPC commands reliability judgment applied by the UE 20 when it is in soft handover. In one embodiment of the present invention a TPC command is introduced to signal "hold the output power" to the UE 20.

Moreover, if there are several UEs contributing to the power rush in a detected instability situation the TCP commands up-down-up-down signaled to the various UEs should be staggered as far as possible so that approximately half the UEs receive an "up" command and the other half receive a "down" command.

As an alternative embodiment, there may be a configurable limited output power increase operation where the base station sends specific TPC command patterns to the UE, both considering the variations in the radio link quality and limited output power increase conditions. Moreover, the configurable limited output power increase operation restricts the number of power adjustments upwards relative the total number of power control commands over a predetermined number of control periods or slots. For example, the max number of "up" commands per 30 commands could be configurable to avoid the worst case situation of 30 "up" commands, while still enabling some output power increases for the UEs in need to avoid jeopardizing coverage. By restricting the number of "up" commands to less than half of the considered commands, in this case 30, the configurable limited output power increase operation corresponds to an output power decrease operation for the UEs, which could further help resolving a congestion situation.

Figure 3:
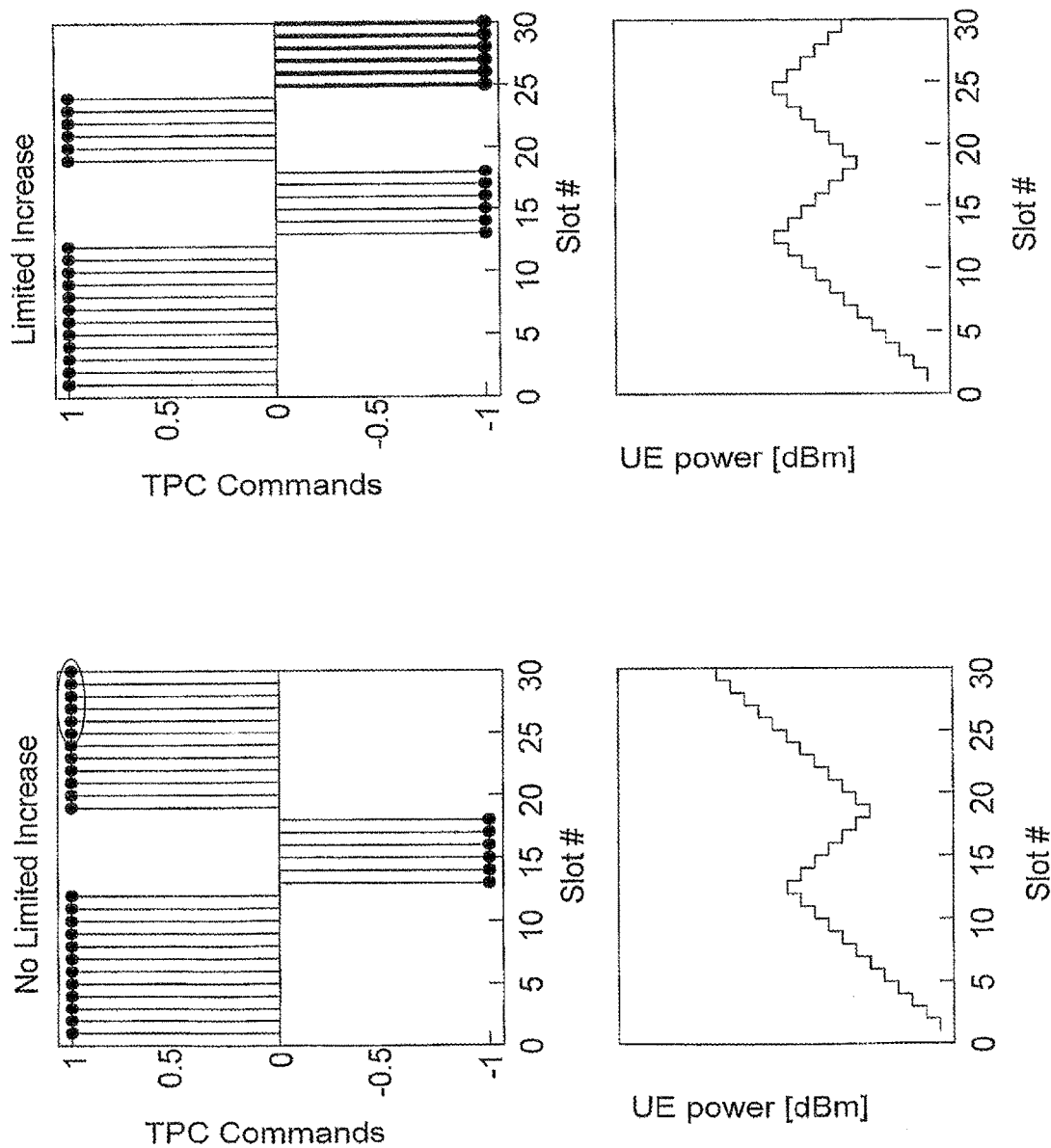
FIG. 3 illustrates the limited output power increase operation at a base station for a particular mobile in accordance with the present invention.

As illustrated by the example in FIG. 3, where the limited output power increase method has configured max 18 "up" commands for a particular UE. Considering only the comparison between estimated SIR and SIR target, then the base station would issue 24 "up" commands out of 30 commands as seen in the two left plots. With the limited increase function, the last six commands will instead be "down" commands to comply with the configuration as illustrated by the right plots.

If the detection of instability by the Node B 30 is based on that the SIR error variance has exceeded a predefined threshold, the SIR error could be used to identify which UEs' SIR target to hold.

When the instability is resolved, the number of retransmissions is again signaled over the DCH frame protocol.

Figure 4:
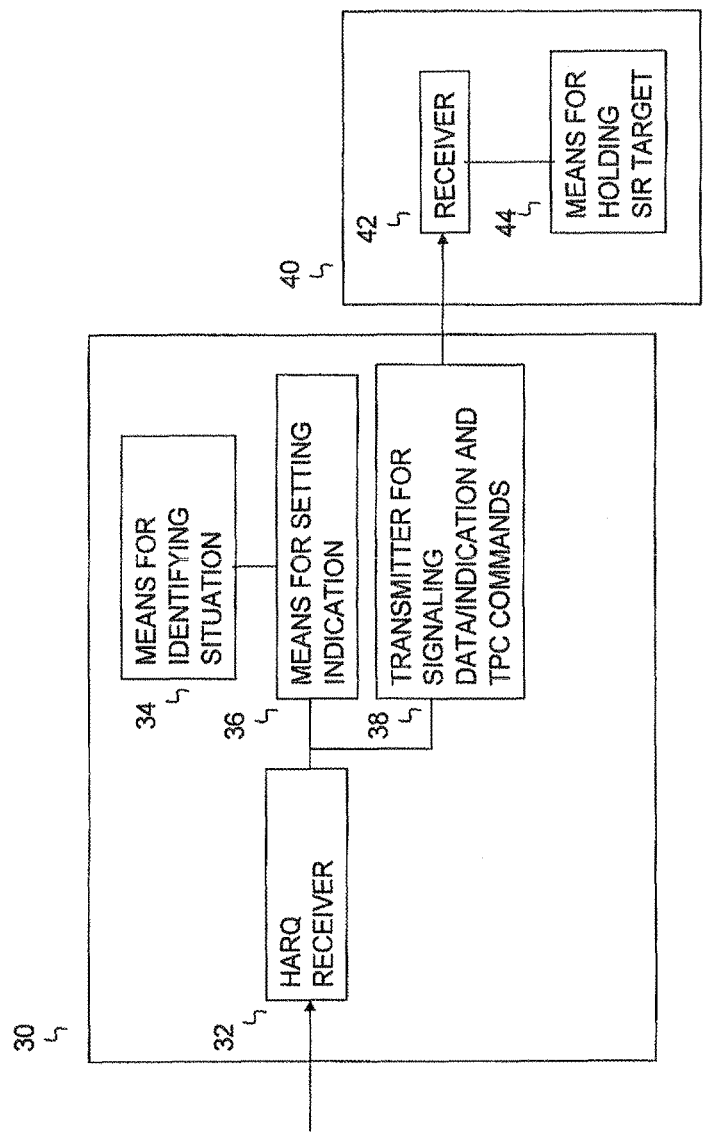
FIG. 4 shows a block diagram schematically illustrating a network node and a radio network controlling node in accordance with the present invention.

As shown in FIG. 4 the Node B 30 comprises a HARQ receiver for receiving uplink data from the UE 20. The HARQ receiver comprises means for decoding the uplink data using the HARQ protocol. The HARQ receiver further comprises means for determining 32 a result of the decoding of the uplink data. The Node B 30 comprises means for identifying 34 if the UE 20 is in a predetermined UE power challenged situation and means for setting 36 the indication to hold the SIR target of the UE 20 based on if the UE 20 has been identified to be in a UE power challenged situation. The Node B 30 further comprises a transmitter adapted for signaling 38 the indication and the uplink data to the RNC 40.

Further as shown in FIG. 4, the RNC 40 comprises a receiver 42 for receiving from the Node B 30 data associated with the UE 20 and the indication associated with the UE 20 to hold the SIR target of the UE if the UE has been identified to be in a predetermined UE power challenged situation. Further the RNC 40 comprises means for holding 44 the SIR target of the UE 20 if indicated in the received indication.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative.

Accordingly, it is intended that the invention be limited only by the scope of the claims appended hereto.

The invention claimed is:

1. A node B for communicating in a wireless communication system with at least one wireless transmit/receive unit (WTRU) and a radio network controller, the node B comprising:
 a processor configured to:
 determine that the WTRU is power challenged;
 determine not to use a number of HARQ retransmissions for power control based on determining that the WTRU is power challenged; and
 determine to send a message to the network controller with a numerical value of thirteen or fourteen in a dedicated channel (DCH) frame that indicates to the network controller not to use a number of HARQ retransmissions for power control.

2. The node B of claim 1, further comprising a receiver for receiving communications from the WTRU on an uplink channel with the number of HARQ protocol retransmissions.

3. The node B of claim 1, wherein the DCH frame comprises a number of HARQ retransmissions field.

4. The node B of claim 1, the numerical value of thirteen nor fourteen in the dedicated channel (DCH) frame protocol indicates that a target signal to noise ratio for the WTRU should remain constant based on determining that the WTRU is power challenged.

5. The node B of claim 1, further comprising a transmitter for transmitting the numerical value of thirteen or fourteen in the dedicated channel (DCH) frame to the radio network controller.

6. The node B of claim 1, wherein the processor is further configured to generate a transmit power control (TPC) command to the WTRU.

7. The node B of claim 1, wherein the processor is further configured to determine whether there was a HARQ error in the communications between the WTRU and the Node B.

8. The node B of claim 7, wherein the processor is further configured to determine whether there was a HARQ error in the communications between the WTRU and the node B comprises determining whether the number of HARQ retransmissions is greater than a threshold.

9. The node B of claim 7, wherein the processor is further configured to generate a message that provides an indication to the radio network controller that a target signal to noise ratio for the WTRU should remain constant based on determining that there was a HARQ error.

10. A method in a node B, for communicating in a wireless communication system with at least one wireless transmit/receive unit (WTRU) and a radio network controller, comprising:
 determining that the WTRU is power challenged;
 determining not to use a number of HARQ retransmissions as for power control based on determining that the WTRU is power challenged; and
 determining to send a message to the network controller with a numerical value of thirteen or fourteen in a dedicated channel (DCH) frame that indicates to the network controller not to use a number of HARQ retransmissions for power control.

11. The method of claim 10, further comprising receiving communications from the WTRU on an uplink channel with the number of HARQ protocol retransmissions.

12. The method of claim 11, wherein the DCH frame comprises a number of HARQ retransmissions field.

13. The method of claim 10, wherein the numerical value of thirteen nor fourteen in the dedicated channel (DCH) frame protocol indicates that a target signal to noise ratio for the WTRU should remain constant based on determining that the WTRU is power challenged.

14. The method of claim 10, further comprising transmitting the numerical value of thirteen or fourteen in the dedicated channel (DCH) frame to the radio network controller.

15. The method of claim 10, further comprising generating instructions for providing a transmit power control (TPC) command to the WTRU.

16. The method of claim 10, further comprising determining whether there was a HARQ error in communications between the WTRU and the node B.

17. The method of claim 16, wherein determining whether there was a HARQ error in the communications between the WTRU and the node B comprises determining whether the number of HARQ retransmissions is greater than a threshold.

18. The method of claim 16, further comprising generating a message that provides an indication to the radio network controller that a target signal to noise ratio for the WTRU should remain constant based on determining that there was a HARQ error.

* * * * *